US009740958B2

(12) United States Patent
Lee et al.

(10) Patent No.: US 9,740,958 B2
(45) Date of Patent: Aug. 22, 2017

(54) METHOD FOR VIGNETTING CORRECTION OF IMAGE AND APPARATUS THEREFOR

(71) Applicant: POSTECH ACADEMY—INDUSTRY FOUNDATION, Pohang-si, Gyeongsangbuk-do (KR)

(72) Inventors: Seung Yong Lee, Pohang-si (KR); Ho Jin Cho, Busan (KR); Hyun Joon Lee, Jecheon-si (KR)

(73) Assignee: POSTECH ACADEMY-INDUSTRY FOUNDATION, Pohang-si, Gyeongsangbuk-do (KR)

( * ) Notice: Subject to any disclaimer, the term of this patent is extended or adjusted under 35 U.S.C. 154(b) by 0 days.

(21) Appl. No.: 14/757,620

(22) Filed: Dec. 23, 2015

(65) Prior Publication Data
US 2016/0189353 A1   Jun. 30, 2016

(30) Foreign Application Priority Data
Dec. 23, 2014   (KR) .......................... 10-2014-0186920

(51) Int. Cl.
*G06K 9/46* (2006.01)
*G06T 5/00* (2006.01)

(52) U.S. Cl.
CPC ............ *G06K 9/4661* (2013.01); *G06T 5/008* (2013.01)

(58) Field of Classification Search
CPC .. G06K 9/4661; G06K 9/6202; H04N 5/3572; H04N 13/0232; H04N 5/23212;

(Continued)

(56) References Cited

U.S. PATENT DOCUMENTS 5,434,902 A * 7/1995 Bruijns ................... H04N 5/32
                                          348/E5.079
2003/0234866 A1* 12/2003 Cutler ..................... G06T 5/008
                                          348/207.1

(Continued)

FOREIGN PATENT DOCUMENTS

| KR | 100769724 B1 | 10/2007 |
| KR | 1020110000880 A | 1/2011 |
| KR | 102011010553 A | 9/2011 |

OTHER PUBLICATIONS

Hojin Cho, et al; "Image Statistics Analysis for Single Image Vignetting Correction", DBpia; http://www.dbpia.co.kr/Article/3474890; 2 pages; pp. 1303-1304; Jun. 2014.

(Continued)

*Primary Examiner* — Jingge Wu
(74) *Attorney, Agent, or Firm* — Ladas & Parry LLP

(57) ABSTRACT

Method and apparatuses for correcting vignetting effects of an image are disclosed. A method for vignetting correction of an image according to an exemplary embodiment of the present disclosure may comprise receiving a two-dimensional image; calculating a radial bright channel representing intensity of the two-dimensional image; estimating a vignetting function of the two-dimensional image having similarity to the calculated radial bright channel; and correcting the vignetting effects of the two-dimensional image by using the estimated vignetting function. The vignetting correction methods and apparatuses according to the present disclosure can rapidly correct vignetting effects of an image by using a smaller memory, and correct vignetting effects of an arbitrary single image without being affected by a camera setting and camera lenses used for the image.

14 Claims, 3 Drawing Sheets

(58) Field of Classification Search
CPC .... H04N 5/23229; G01B 11/08; G06T 5/008; G06T 5/00; G06T 7/0004
See application file for complete search history.

(56) References Cited

U.S. PATENT DOCUMENTS

| | | | | |
|---|---|---|---|---|
| 2004/0257454 | A1* | 12/2004 | Pinto | G06T 5/006 348/222.1 |
| 2006/0204128 | A1* | 9/2006 | Silverstein | G06T 5/008 382/275 |
| 2007/0146506 | A1* | 6/2007 | Lin | G06T 5/007 348/241 |
| 2007/0211154 | A1* | 9/2007 | Mahmoud | H04N 5/3572 348/251 |
| 2009/0021632 | A1* | 1/2009 | Huggett | G06T 5/006 348/349 |
| 2011/0285873 | A1* | 11/2011 | Showering | G06K 9/228 348/231.99 |
| 2013/0124159 | A1* | 5/2013 | Chen | G06T 5/006 703/2 |
| 2013/0342741 | A1* | 12/2013 | Liu | H04N 5/3572 348/280 |
| 2014/0341425 | A1* | 11/2014 | Babacan | G06K 9/00228 382/103 |

OTHER PUBLICATIONS

Hojin Cho, et al; "Radial Bright Channel Prior for Single Image Vignetting Correction", Proc. 13th European Conference on Computer Vision (ECCV 2014) Sep. 6-12, 2014, Zurich, Switzerland; vol. 8690 of the series Lecture Notes in Computer Science pp. 189-202.

Dan B. Goldman; "Vignette and Exposure Calibration and Compensation", IEEE Transactions on Pattern Analysis and Machine Intelligence, vol. 32, No. 12, Dec. 2010; pp. 2276-2288.

Seon Joo Kim, et al; "Robust Radiometric Calibration and Vignetting Correction", IEEE Transactions on Pattern Analysis and Machine Intelligence, vol. 30, No. 4, Apr. 2008; pp. 562-576.

Yuanjie Zheng, et al "Single-Image Vignetting Correction", IEEE Transactions on Pattern Analysis and Machine Intelligence, vol. 31, No. 12, Dec. 2009 pp. 2243-2256.

Yuanjie Zheng, et al; "Single-Image Vignetting Correction from Gradient Distribution Symmetries", IEEE Transactions on Pattern Analysis and Machine Intelligence, vol. 35, No. 6, Jun. 2013; pp. 1480-1493.

* cited by examiner

METHOD FOR VIGNETTING CORRECTION OF IMAGE AND APPARATUS THEREFOR

CROSS-REFERENCE TO RELATED APPLICATIONS

This application claims priority to Korean Patent Application No. 10-2014-0186920 filed on Dec. 23, 2014 in the Korean Intellectual Property Office (KIPO), the entire contents of which are hereby incorporated by reference.

BACKGROUND

1. Technical Field

The present disclosure relates to a technology of correcting two-dimensional images, and more particularly to a method for correcting vignetting effects of a two-dimensional image by estimating a vignetting function representing the vignetting effects of the two-dimensional image and an apparatus for the same.

2. Related Art

In imaging technology domains, a 'vignetting' usually means an effect in which intensity of lights is attenuated radially from an optical center of an image. Such the vignetting effects may prevent scenes included in the image from being correctly delivered to viewers.

Therefore, various methods for correcting vignetting effects of an image are being studied in the imaging technology domains. The most widely-used vignetting correction method is a method based on photometric calibration which measures a unique vignetting function of a camera by using a template image predefined according to setting and lenses of the camera. However, the method based on the photometric calibration can remove vignetting effects only corresponding to the setting and lenses of the camera, and they cannot perform vignetting correction on arbitrary images.

On the other hand, vignetting correction methods using a plurality of images having different intensity attenuation are being used. Since such the methods use a property that different images captured by using the same camera have the same vignetting function, the predefined template images are not necessary. However, since the methods need a plurality of images, there is a problem that vignetting correction on an arbitrary single image downloaded from an internet is difficult.

Recently, vignetting correction methods for an arbitrary single image have been introduced. For example, a vignetting function estimation method using intensity attenuation of respective areas segmented by performing image segmentation techniques on areas having homogeneous color or texture has been introduced. Also, a vignetting function estimation method using symmetry of a radial gradient distribution of an image has been introduced.

Although the above vignetting estimation and correction methods using a single image can be flexibly applied to various images, the method based on image segmentation is weak to noise of the image, and the method using symmetry of a radial gradient distribution of an image has high computational complexity and is sensitive to numerical errors. Especially, since such the methods use two-dimensional image optimization, it takes too much time for the methods to perform vignetting function estimation.

SUMMARY

Accordingly, exemplary embodiments of the present invention are provided to substantially obviate one or more problems due to limitations and disadvantages of the related art.

Exemplary embodiments according to the present disclosure provide methods for correcting vignetting effects of an image by estimating a vignetting function for the vignetting effects.

Also, exemplary embodiments according to the present disclosure provide an apparatus for correcting vignetting effects of an image by estimating a vignetting function for the vignetting effects.

In order to achieve the above-described objectives, a method for correcting vignetting effects on an image according to an exemplary embodiment of the present disclosure may comprise receiving a two-dimensional (2D) image; calculating a radial bright channel representing intensity of the 2D image; estimating a vignetting function of the 2D image having similarity to the calculated radial bright channel; and correcting the vignetting effects of the 2D image by using the estimated vignetting function.

Here, the radial bright channel may represent intensity according to a distance from an optical center of the 2D image.

Here, the estimating a vignetting function may comprise estimating an one-dimensional (1D) vignetting function having maximum similarity to the intensity which the radial bright channel represents; obtaining values corresponding to a plurality of parameters included in the 1D vignetting function by analyzing the radial bright channel; and estimating the vignetting function of the 2D image by inputting the obtained values into the respective plurality of parameters of the 1D vignetting function.

Also, the 1D vignetting function may be estimated by applying information on the intensity of the 2D image which is represented by the radial bright channel to a pre-configured vignetting model function.

Also, the pre-configured vignetting model function may include information on off-axis illumination of the 2D image and information on a geometric factor of the 2D image.

Here, the plurality of parameters may include the length of the radial bright channel, a correction coefficient for scaling the vignetting function to make intensity of the vignetting function become similar to intensity of the radial bright channel, and a threshold value for determining an outlier of the 2D image by comparing the intensity of the vignetting function and the intensity of the radio bright channel.

Here, the estimating the vignetting function may comprise configuring weighting values for processing an outlier of the 2D image after estimating the vignetting function of the 2D image; and estimating the vignetting function by updating the weighting values and the threshold value according to a result of comparison between the configured weighting values and the threshold value.

Here, the correcting the vignetting effects of the 2D image may comprise converting a size of a vignetting image represented by the estimated vignetting function to a size corresponding to that of the 2D image; and correcting the vignetting effects of the 2D image by removing the vignetting image whose size is converted from the 2D image.

In order to achieve the above-described objectives, a vignetting correction apparatus for correcting vignetting effects of an image according to an exemplary embodiment of the present disclosure may comprise a processor, and a memory storing at least one program command executed by the processor. Also, the at least one program command may comprise a step of receiving a two-dimensional (2D) image; a step of calculating a radial bright channel representing intensity of the 2D image; a step of estimating a vignetting function of the 2D image having similarity to the calculated radial bright channel; and a step of correcting the vignetting effects of the 2D image by using the estimated vignetting function.

Here, the radial bright channel may represent intensity according to a distance from an optical center of the 2D image.

Here, the step of estimating a vignetting function may further comprise a step of estimating an one-dimensional (1D) vignetting function having maximum similarity to the intensity which the radial bright channel represents; a step of obtaining values corresponding to a plurality of parameters included in the 1D vignetting function by analyzing the radial bright channel; and a step of estimating the vignetting function of the 2D image by inputting the obtained values into the respective plurality of parameters of the 1D vignetting function.

Also, the 1D vignetting function may be estimated by applying information on the intensity of the 2D image which is represented by the radial bright channel to a pre-configured vignetting model function.

Also, the pre-configured vignetting model function may include information on off-axis illumination of the 2D image and information on a geometric factor of the 2D image.

Also, the plurality of parameters may include a length of the radial bright channel, a correction coefficient for scaling the vignetting function to make intensity of the vignetting function become similar to intensity of the radial bright channel, and a threshold value for determining an outlier of the 2D image by comparing the intensity of the vignetting function and the intensity of the radio bright channel.

Also, the step of estimating the vignetting function may comprise a step of configuring weighting values for processing an outlier of the 2D image after estimating the vignetting function of the 2D image; and a step of estimating the vignetting function by updating the weighting values and the threshold value according to a result of comparison between the configured weighting values and the threshold value.

Here, the step of correcting the vignetting effects of the 2D image may comprise a step of converting a size of a vignetting image represented by the estimated vignetting function to a size corresponding to that of the 2D image; and a step of correcting the vignetting effects of the 2D image by removing the vignetting image whose size is converted from the 2D image.

The above-described vignetting correction method may rapidly correct vignetting effects of an image by using a smaller memory, and correct vignetting effects of an arbitrary single image without being affected by a camera setting and camera lenses used for the image.

BRIEF DESCRIPTION OF DRAWINGS

Exemplary embodiments of the present invention will become more apparent by describing in detail exemplary embodiments of the present invention with reference to the accompanying drawings, in which.

DETAILED DESCRIPTION

Figure 1:
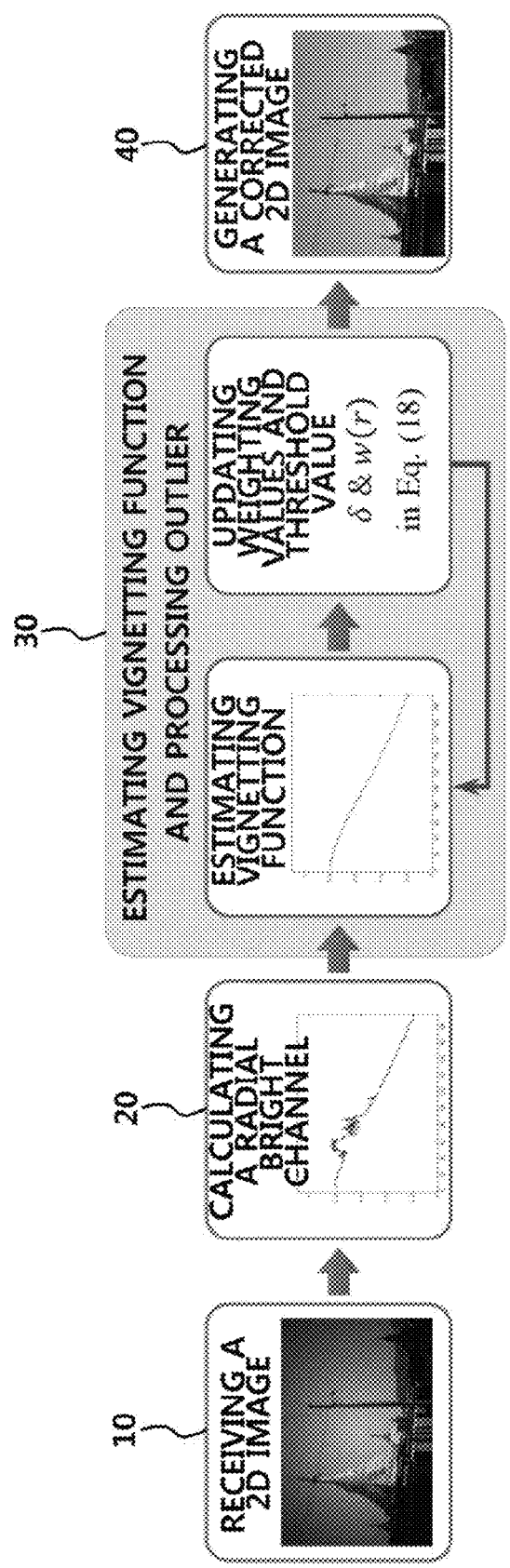
FIG. 1 is a conceptual diagram illustrating a method for vignetting correction on an image according to an exemplary embodiment of the present disclosure.

Example embodiments of the present invention are disclosed herein. However, specific structural and functional details disclosed herein arc merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" with another element, it can be directly connected or coupled with the other element or intervening elements may be present. In contrast, when an element is referred to as being "directly connected" or "directly coupled" with another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be described in detail with reference to the appended drawings.

In the following description, for easy understanding, like numbers refer to like elements throughout the description of the figures, and the same elements will not be described further.

FIG. 1 is a conceptual diagram illustrating a method for vignetting correction on an image according to an exemplary embodiment of the present disclosure.

Referring to FIG. 1, the method may be performed by an apparatus for correcting vignetting effects included in an image (hereinafter, referred to as a 'vignetting correction apparatus').

First, the vignetting correction apparatus may receive a two-dimensional (2D) image (10), calculate a radial bright channel of the received 2D image (20), estimate a vignetting function of the 2D image, process an outlier of the 2D image by using the calculated radial bright channel (30), and generate a corrected 2D image (40).

Here, in the step 30 for estimating the vignetting function and processing the outlier, the vignetting correction apparatus may estimate the vignetting function by updating weighting values included in the vignetting function and a threshold value. Hereinafter, referring to FIGS. 2 and 3, procedures constituting the vignetting correction method according to an exemplary embodiment of the present disclosure will be explained in detail.

Figure 2:
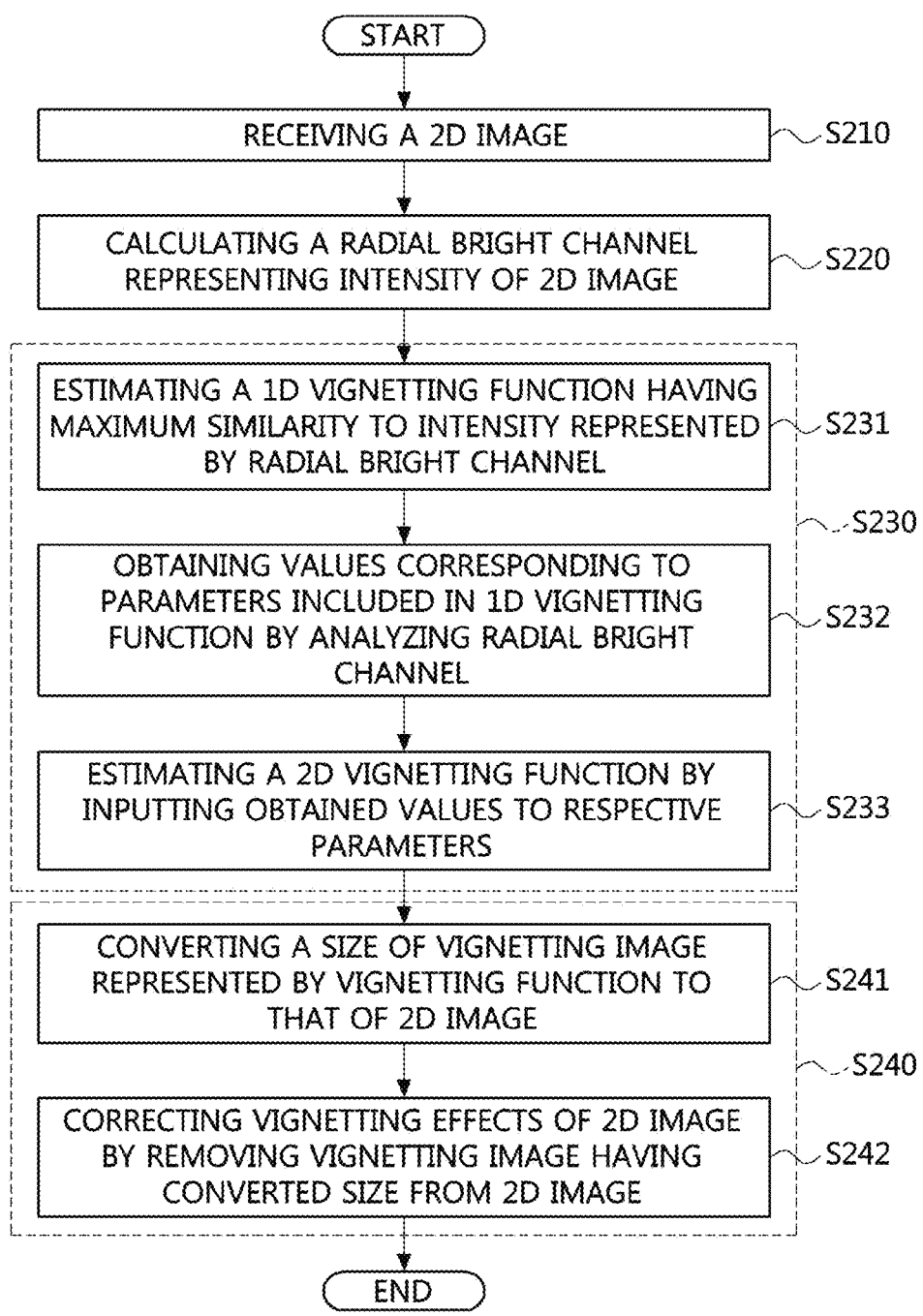
FIG. 2 is a flow chart illustrating a vignetting correction method according to an exemplary embodiment of the present disclosure.
Figure 3:
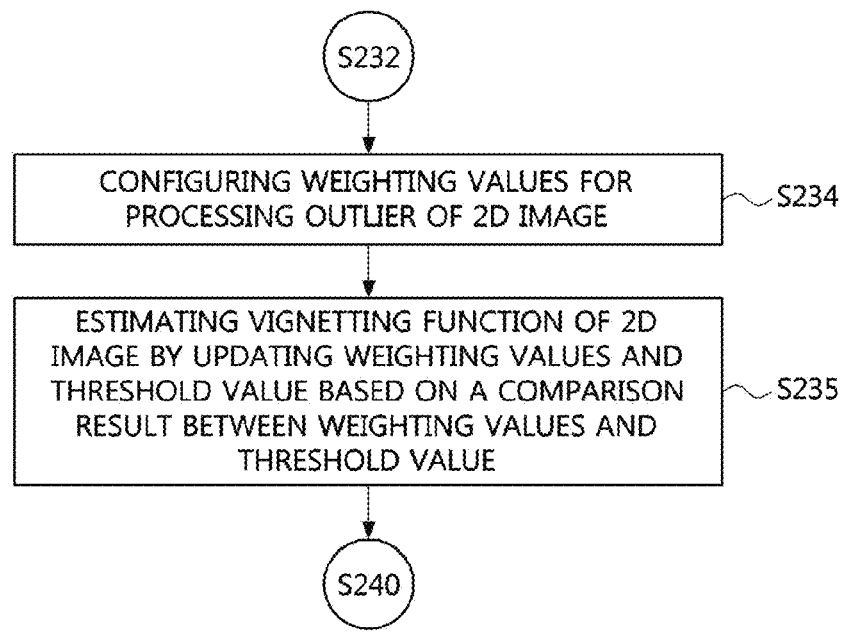
FIG. 3 is a flow chart illustrating a method for processing an outlier of a two-dimensional image by configuring weighting values in the vignetting correction method illustrated in FIG. 2.

FIG. 2 is a flow chart illustrating a vignetting correction method according to an exemplary embodiment of the present disclosure, and FIG. 3 is a flow chart illustrating a method for processing an outlier of a two-dimensional image by configuring weighting values in the vignetting correction method illustrated in FIG. 2.

First, referring to FIG. 2, the vignetting correction apparatus may receive a 2D image (S210). For example, the vignetting correction apparatus may download the 2D image from an Internet when the apparatus is connected to the internet. Also, the vignetting correction apparatus may receive a 2D image form a storage device when the apparatus is connected to the storage device storing the 2D image. Here, the 2D image may mean a 2D image having vignetting effects.

Then, the vignetting correction apparatus may calculate a radial bright channel representing intensity of the 2D image (S220). Here, the radial bright channel may mean intensity according to a distance from an optical center of the 2D image. For example, the radial bright channel may be calculated in a form of a graph having x-axis and y-axis. Here, the x-axis may mean distances from the optical center of the 2D image, and the y-axis may mean intensity corresponding to a point of the x-axis. Also, the intensity of the radial bright channel may mean intensity of lights, and the intensity of lights may mean the maximum value among a red pixel value (R), a green pixel value (G), and a blue pixel value (B) of respective pixels constituting the 2D image.

Here, the radial bright channel may be used for any other methods of processing 2D images according to its property, without being restricted to the above-described vignetting effect correction method.

Then, the vignetting correction apparatus may estimate a vignetting function of the 2D image having similarity to the calculated radial bright channel (S230). In order for the vignetting correction apparatus to estimate the vignetting function, the vignetting correction apparatus may first estimate an one-dimensional (1D) vignetting function having the maximum similarity to the intensity represented by the calculated radial bright channel (S231).

Here, the vignetting correction apparatus may estimate the 1D vignetting function by applying information on the intensity of the 2D image represented by the radial bright channel to a pre-configured vignetting model function. Here, the pre-configured model function may be a primitive vignetting function to be used for estimating the vignetting function representing vignetting effects of the 2D image.

That is, the vignetting correction apparatus may analyze the radial bright channel of the 2D image, thereby obtaining the information on the intensity of the 2D image. Then, the vignetting correction apparatus may estimate the 1D vignetting function by inputting the information on intensity to respective parameters included in the vignetting model function. Here, the information on intensity, which is obtained from the radial bright channel, may include off-axis illumination information of the 2D image and geometric factor information of the 2D image.

Hereinafter, a plurality of equations, which are used for calculating the radial bright channel of the received 2D image and for estimating the 1D vignetting function by using the calculated radial bright channel, will be explained.

First, the 2D image received at the vignetting correction apparatus may have vignetting effects. Specifically, in the 2D image, intensity may be attenuated from the optical center of the image so that edge regions of the image are darker than the center region. The relations among the 2D image having such the vignetting effects, the above-described 1D vignetting function, and a 2D image having no vignetting effects may be represented as a below equation 1.

$$Z(r, \theta) = V(r) \cdot I(r, \theta) \quad \text{[Equation 1]}$$

In the equation 1, Z may mean the 2D image having vignetting effects, $(\gamma, \theta)$ may respectively mean a distance and an angle from an optical center of Z in a polar coordinate system in which the optical center becomes an origin point. Also, V of the equation 1 may mean the 1D vignetting function, and I of the equation 1 may mean a 2D image having no vignetting effects.

In the present disclosure, it may be assumed that the 1D vignetting function V has a property of rotational symmetry with respect to the optical center and depends only on the distance $\gamma$ regardless of $\theta$.

Also, an 1D radial bright channel $I^{RB}$ of the 2D image having no vignetting effects (I) may be represented as a below equation 2.

$$I^{RB}(r) = \max_{\theta} \left\{ \max_{C \in (R,G,B)} I^C(r, \theta) \right\} \quad \text{[Equation 2]}$$

In the equation 2, $C \in \{R, G, B\}$, and $\theta \in \{0, 2\pi\}$. Also, $I^C$ may mean a color channel of the 2D image having no vignetting effects (I).

Also, the pre-configured vignetting model function used for the vignetting correction apparatus to estimate the 1D vignetting function may be represented as a below equation 3.

$$V(r) = A(r) \cdot G(r) \quad \text{[Equation 3]}$$

In the equation 3, A(r) may mean off-axis illumination of the 2D image, and may be represented as a below equation 4. In the equation 4, f may mean a focal length of a camera. Also, G(r) of the equation 3 may mean a geometric factor of the 2D image, and be represented as a below equation 5.

$$A(r) = \frac{1}{(1 + (r/f)^2)^2} \quad \text{[Equation 4]}$$

$$G(r) = 1 - \sum_{i=1}^{p} \alpha_i \left(\frac{r}{n}\right)^p \quad \text{[Equation 5]}$$

In the equation 5, n may mean the length of the radial bright channel.

Re-referring to FIG. 2, the vignetting correction apparatus may obtain values corresponding to the plurality of parameters included in the estimated 1D vignetting function by analyzing the radial bright channel (S232). Here, the plurality of parameters may include the length of the radial bright channel, a correction coefficient for scaling the vignetting function to make intensity of the vignetting function become similar to intensity of the radial bright channel, and a threshold value for determining an outlier of the 2D image by comparing the intensity of the vignetting function and the intensity of the radial bright channel.

Then, the vignetting correction apparatus may estimate the vignetting function by inputting the obtained values to respective plurality of parameters included in the 1D vignetting function (S233). Here, the vignetting function estimated by the vignetting correction apparatus may be incorrect due to noises and saturation pixels of the 2D image. Therefore, the vignetting correction apparatus may enhance accuracy of the vignetting function by adjusting the weighting values included in a 2D function and the threshold value.

Specifically, referring to FIG. 3, the vignetting correction apparatus may configure weighting values for processing an outlier of the 2D image after estimating the vignetting function of the 2D image (S234).

Here, initial weighting values may be preferentially applied according to reliability of the radial bright channel of the 2D image. Here, the reliability of the radial bright channel may have a bigger value as close to the optical center of the 2D image, and have a smaller value as far from the optical center of the 2D image.

Hereinafter, a plurality of equations, which are used for estimating the vignetting function for correcting vignetting effects of the 2D image, will be explained.

First, as described in the step S232, a form of the 1D vignetting function to which the vignetting correction apparatus inputs values corresponding to the plurality of parameters may be represented as a below equation 6.

That is, the vignetting correction apparatus may obtain the values corresponding to parameters included in the below equation 6 by analyzing the radial bright channel of the 2D image, input the obtained values to the below equation 6, and estimate the vignetting function representing vignetting effects which the 2D image has.

$$\arg\min_{c_o, f, \{\alpha_i\}} \lambda_d E_{data} + \lambda_{c_o} E_{c_o} + \lambda_f E_f + \lambda_\alpha \sum_{i=1}^{p} E_{\alpha_i} \quad \text{[Equation 6]}$$

$$\text{subject to } \forall_r V(r) \geq V(r+1) \text{ and } 0 \leq c_o \leq 1$$

In the equation 6, $E_{data}$ may mean a term of data needed for the radial bright channel of 2D image to have similarity to the estimated vignetting function, and be represented as a below equation 7.

That is, through a below equation 7, the vignetting correction apparatus may make the estimated vignetting function reflect more precisely the information on intensity of the 2D image included in the radial bright channel of the 2D image.

$$E_{data} = \sum_{r=1}^{n} w(r) \cdot \min(|c_o V(r) - Z^{RB}(r)|, \delta) \quad \text{[Equation 7]}$$

In the equation 7, n may mean the length of the radial bright channel, and Co may mean a correction coefficient scaling the vignetting function V for the scaled vignetting function to have a similar value to that of $Z^{RB}$, when the estimated vignetting function usually has a value between 0 and 1. Also, δ of the equation 7 may mean a threshold value used for determining an outlier by comparing the estimated vignetting function V and the radial bright channel $Z^{RB}$.

Also, in the equation 7, w(r) may mean weighting values considering reliability of the radial bright channel of the 2D image. That is, the values included in the radial bright channel may become incorrect as they are far from the optical center of the 2D image. Accordingly, the vignetting correction apparatus may configure weighting values representing reliability of the radial bright channel in the vignetting function, and initially-configured weighting values may be represented as a below equation 8.

$$w(r) = \frac{r^2}{\sum_{r=1}^{n} r^2} \quad \text{[Equation 8]}$$

Also, in the equation 6, $E_{C_o}$ may mean a value for making the correction coefficient Co become similar to the maximum value of the radial bright channel of the 2D image, $E_f$ may mean a value for making the focal length f become similar to the size of the 2D image, S=max(width, height). Also, Eα may mean values for smoothing the geometric factor of the vignetting function of the 2D image. Especially, $E_{C_o}$, $E_f$, and Eα may be represented as a below equation 9.

$$E_{c_o} = (\max(c_o V \mid w) - \max(Z^{RB} \mid w))^2 \quad \text{[Equation 9]}$$

$$E_f = \left(\frac{(S-f)}{S}\right)^2$$

$$E_\alpha = \alpha_i^2$$

Also, the vignetting function included in the above equation 6 may have a constraint of non-increasing. Specifically, the vignetting function may have a constraint of non-increasing through a below equation 10.

$$C_{dec} \equiv \lambda_{dec} \sum_{r=1}^{n-1} \max(V(r+1) - V(r), 0)^2 \quad \text{[Equation 10]}$$

In the equation 10, $C_{dec}$ may mean a constraint of non-increasing. Specifically, according to the equation 10, the value of Co may prevent the value of vignetting function V from being greater than 1.

Also, the 1D vignetting function represented by the equation 6 may estimate the vignetting function of the 2D image more precisely through the procedure of updating the initially-configured weighting values and the threshold value. Specifically, the vignetting correction apparatus may update the weighting values and the threshold value according to a below equation 11.

$$w(r) = \begin{cases} w(r) & \text{if } |c_o V(r) - Z^{RB}(r)| < \delta \\ 0 & \text{otherwise} \end{cases}$$

$$\delta = \delta/2$$

[Equation 11]

Re-referring to FIG. 2, the vignetting correction apparatus may estimate the vignetting function by updating the weighting values and the threshold value according to a result of comparison between the configured weighting values and the threshold value (S235). Specifically, the vignetting correction apparatus may update the weighting values and the threshold value according to the equation 11.

Then, the vignetting correction apparatus may correct the vignetting effects of the 2D image by using the estimated vignetting function (S240). Specifically, the vignetting correction apparatus may convert the size of a vignetting image represented by the vignetting function to a size corresponding to that of the 2D image (S241). Then, the vignetting correction apparatus may correct the vignetting effects of the 2D image by removing the vignetting image whose size is converted from the 2D image (S242).

Figure 4:
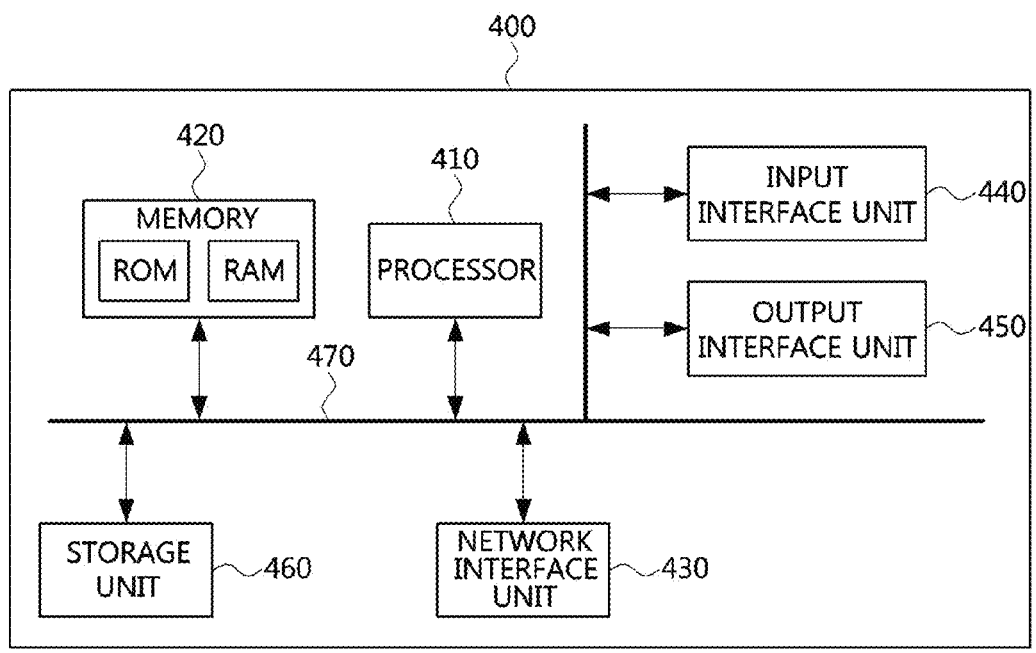
FIG. 4 is a block diagram illustrating a vignetting correction apparatus according to an exemplary embodiment of the present disclosure.

FIG. 4 is a block diagram illustrating a vignetting correction apparatus according to an exemplary embodiment of the present disclosure.

Referring to FIG. 4, the vignetting correction apparatus may mean an apparatus performing the method for vignetting correction explained referring to FIG. 2 and FIG. 3.

The vignetting correction apparatus 400 may include at least one processor 410, a memory 420, and a network interface unit 430 which perform communications as connected to a network. Also, the vignetting correction apparatus 400 may further include an input interface unit 440, an output interface unit 450, and a storage unit 460. The components included in the vignetting correction apparatus 400 may be connected to a bus 470, and they communicate with each other via the bus 470.

The processor 410 may execute program commands stored in the memory 420 and/or the storage unit 460. The processor 410 may mean a central processing unit (CPU), a graphics processing unit (GPU), or a dedicated processor performing the methods according to the present disclosure. The memory 420 and the storage unit 460 may be implemented using a volatile memory medium and/or a non-volatile memory medium. For example, the memory 420 may comprise a read-only memory (ROM) and/or a random access memory (RAM).

Here, the program commands executed by the processor 410 may include a step of receiving a two-dimensional image, a step of calculating a radial bright channel representing intensity of the two-dimensional image, a step of estimating a vignetting function of the two-dimensional image having similarity to the calculated radial bright channel, and a step of correcting vignetting effects of the two-dimensional image by using the estimated vignetting function. Here, the radial bright channel calculated by the processor 410 may mean intensity according to a distance from an optical center of the two-dimensional image.

Also, the step of estimating the vignetting function may comprise a step of estimating an one-dimensional vignetting function having maximum similarity to the intensity which the radial bright channel represents, a step of obtaining values corresponding to a plurality of parameters included in the one-dimensional vignetting function by analyzing the radial bright channel, and a step of estimating the vignetting function of the two-dimensional image by inputting the obtained values into the respective plurality of parameters. Here, the processor 410 may estimate the one-dimensional vignetting function by applying information on intensity of the two-dimensional image represented by the radial bright channel to a pre-configured vignetting model function.

Also, the pre-configured vignetting model function used for the processor 410 to estimate the one-dimensional vignetting function may include information on off-axis illumination of the two-dimensional image and information on geometric factors of the two-dimensional image.

Here, the plurality of parameters included in the one-dimensional vignetting function may include the length of the radial bright channel, a correction coefficient for scaling the vignetting function to make intensity of the vignetting function become similar to intensity of the radial bright channel, and a predetermined threshold value for determining an outlier of the two-dimensional image by comparing the intensity of the vignetting function and the intensity of the radio bright channel.

Also, the step of estimating the vignetting function may comprise a step of configuring weighting values for processing an outlier of the two-dimensional image after estimating the vignetting function of the two-dimensional image, and a step of estimating the vignetting function by updating the weighting values and the predetermined threshold value according to a result of comparison between the configured weighting values and the predetermined threshold value.

Also, the step of correcting vignetting effects of the two-dimensional image may comprise a step of converting a size of a vignetting image represented by the estimated vignetting function to a size corresponding to a size of the two-dimensional image, and a step of correcting the vignetting effects of the two-dimensional image by removing the vignetting image whose size is converted from the two-dimensional image.

Through the above-described procedures, the vignetting correction apparatus may estimate the vignetting function representing vignetting effects which the two-dimensional image include, and correct the vignetting effects included in the two-dimensional image based on the estimated vignetting function.

While the example embodiments of the present invention and their advantages have been described in detail, it should be understood that various changes, substitutions and alterations may he made herein without departing from the scope of the invention.

What is claimed is:

1. A method for vignetting correction on an image, performed in an apparatus for correcting vignetting effects of the image, the method comprising:
    receiving a two-dimensional (2D) image;
    calculating a radial bright channel representing intensity of the 2D image;
    estimating a vignetting function of the 2D image having similarity to the calculated radial bright channel; and
    correcting the vignetting effects of the 2D image by using the estimated vignetting function,
    wherein the estimating a vignetting function comprises:
    estimating an one-dimensional (1D) vignetting function having maximum similarity to the intensity which the radial bright channel represents;

obtaining values corresponding to a plurality of parameters included in the 1D vignetting function by analyzing the radial bright channel; and estimating the vignetting function of the 2D image by inputting the obtained values into the respective plurality of parameters of the 1D vignetting function.

2. The method according to claim 1, wherein the radial bright channel represents intensity according to a distance from an optical center of the 2D image.

3. The method according to claim 1, wherein the 1D vignetting function is estimated by applying information on the intensity of the 2D image which is represented by the radial bright channel to a pre-configured vignetting model function.

4. The method according to claim 3, wherein the pre-configured vignetting model function includes information on off-axis illumination of the 2D image and information on a geometric factor of the 2D image.

5. The method according to claim 1, wherein the plurality of parameters include a length of the radial bright channel, a correction coefficient for scaling the vignetting function to make intensity of the vignetting function become similar to intensity of the radial bright channel, and a threshold value for determining an outlier of the 2D image by comparing the intensity of the vignetting function and the intensity of the radio bright channel.

6. The method according to claim 1, wherein the estimating the vignetting function comprises:
configuring weighting values for processing an outlier of the 2D image after estimating the vignetting function of the 2D image; and
estimating the vignetting function by updating the weighting values and the threshold value according to a result of comparison between the configured weighting values and the threshold value.

7. The method according to claim 1, wherein the correcting the vignetting effects of the 2D image comprises:
converting a size of a vignetting image represented by the estimated vignetting function to a size corresponding to that of the 2D image; and
correcting the vignetting effects of the 2D image by removing the vignetting image whose size is converted from the 2D image.

8. A vignetting correction apparatus for correcting vignetting effects of an image, the apparatus comprising a processor, and a memory storing at least one program command executed by the processor,
wherein the at least one program command includes
a step of receiving a two-dimensional (2D) image;
a step of calculating a radial bright channel representing intensity of the 2D image;
a step of estimating a vignetting function of the 2D image having similarity to the calculated radial bright channel; and a step of correcting the vignetting effects of the 2D image by using the estimated vignetting function,
wherein the step of estimating a vignetting function comprises:
a step of estimating an one-dimensional (1D) vignetting function having maximum similarity to the intensity which the radial bright channel represents;
a step of obtaining values corresponding to a plurality of parameters included in the 1D vignetting function by analyzing the radial bright channel; and
a step of estimating the vignetting function of the 2D image by inputting the obtained values into the respective plurality of parameters of the 1D vignetting function.

9. The apparatus according to claim 8, wherein the radial bright channel represents intensity according to a distance from an optical center of the 2D image.

10. The apparatus according to claim 8, the 1D vignetting function is estimated by applying information on the intensity of the 2D image which is represented by the radial bright channel to a pre-configured vignetting model function.

11. The apparatus according to claim 10, wherein the pre-configured vignetting model function includes information on off-axis illumination of the 2D image and information on a geometric factor of the 2D image.

12. The apparatus according to claim 8, wherein the plurality of parameters include a length of the radial bright channel, a correction coefficient for scaling the vignetting function to make intensity of the vignetting function become similar to intensity of the radial bright channel, and a threshold value for determining an outlier of the 2D image by comparing the intensity of the vignetting function and the intensity of the radio bright channel.

13. The apparatus according to claim 8, wherein the step of estimating the vignetting function comprises:
a step of configuring weighting values for processing an outlier of the 2D image after estimating the vignetting function of the 2D image; and
a step of estimating the vignetting function by updating the weighting values and the threshold value according to a result of comparison between the configured weighting values and the threshold value.

14. The apparatus according to claim 8, wherein the step of correcting the vignetting effects of the 2D image comprises:
a step of converting a size of a vignetting image represented by the estimated vignetting function to a size corresponding to that of the 2D image; and
a step of correcting the vignetting effects of the 2D image by removing the vignetting image whose size is converted from the 2D image.

* * * * *